June 4, 1946. F. B. YINGLING 2,401,677
TWO-CYCLE INTERNAL-COMBUSTION ENGINE
Filed May 11, 1943 4 Sheets-Sheet 3
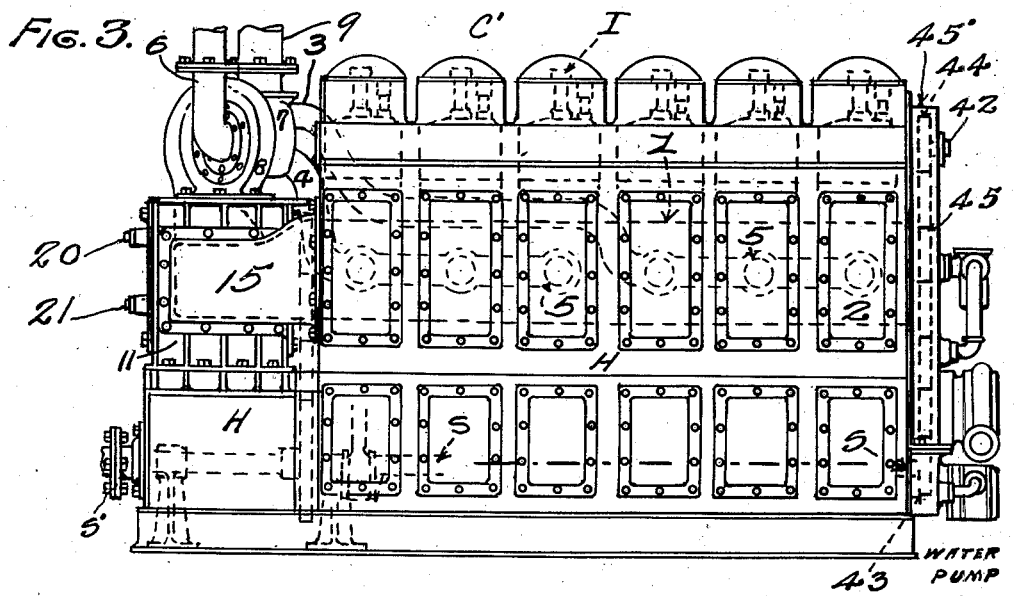
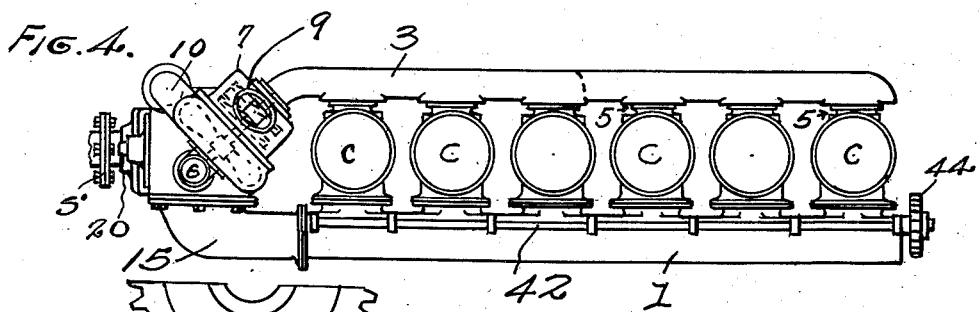
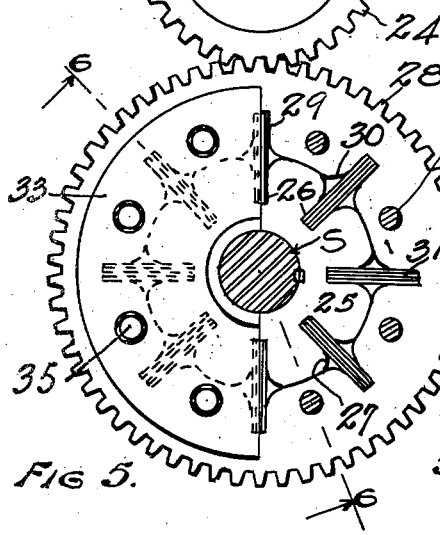
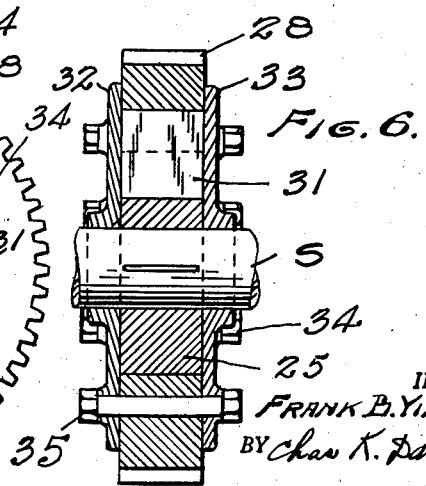
INVENTOR.
FRANK B. YINGLING
BY Chas. K. Davies & Son
Attys.

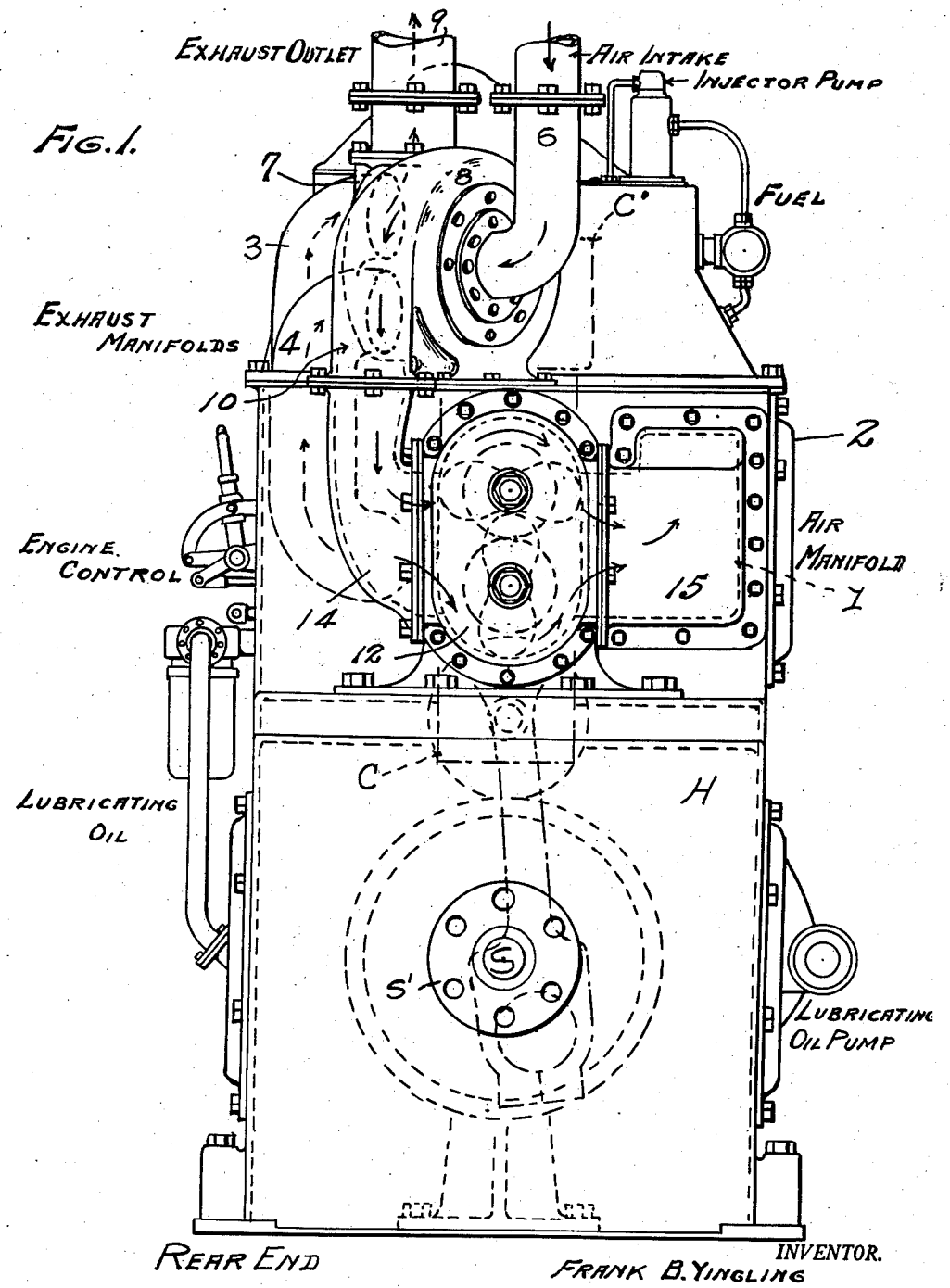

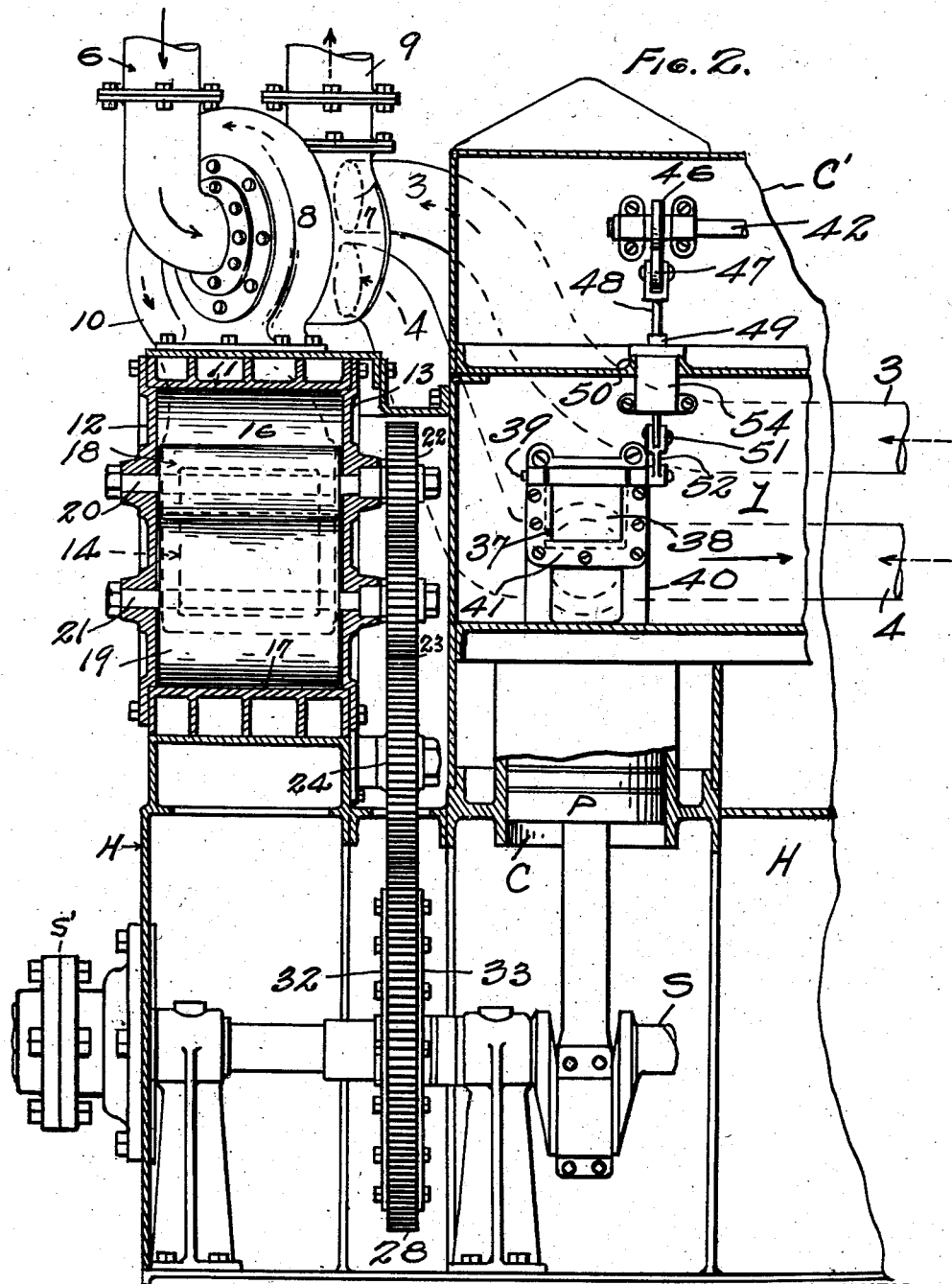

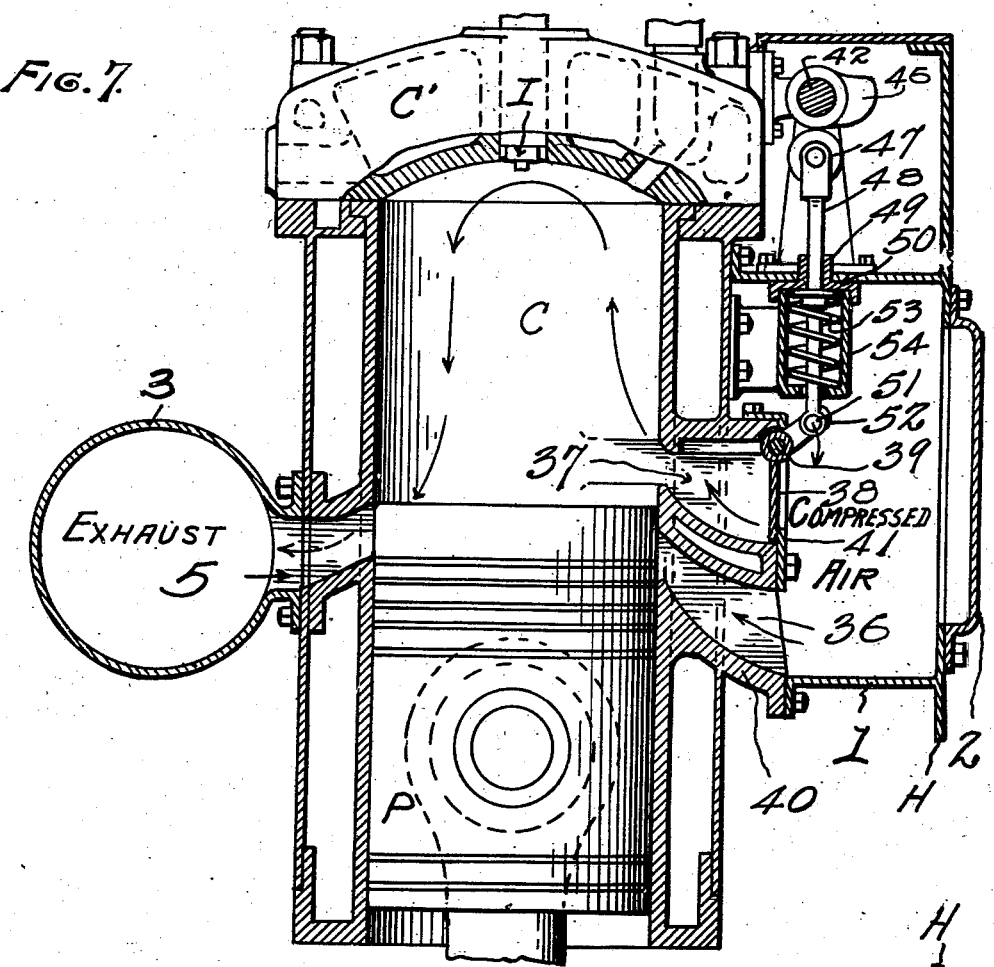
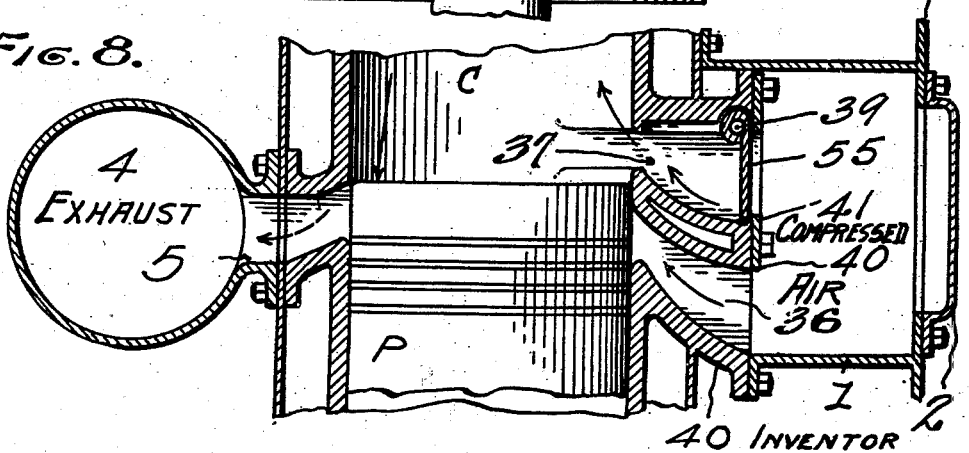

Patented June 4, 1946

2,401,677

UNITED STATES PATENT OFFICE 2,401,677

TWO-CYCLE INTERNAL-COMBUSTION ENGINE

Frank B. Yingling, Hamilton, Ohio

Application May 11, 1943, Serial No. 486,558

12 Claims. (Cl. 123—65)

The invention disclosed in the examplifying drawings is embodied in a multi-cylinder engine of the loop scavenging type, which, while adapted for a variety of services, is especially adaptable for stationary power plants usually employing a non-reversing engine together with attached speed transmission mechanism for the application of power, as for instance to drive an electric generator which furnishes a constant electric current.

The broad principles involved in the present invention and application for patent are involved in my co-pending applications for patent, Serial Number 390,821, filed April 28, 1941, and Serial Number 411,560, filed September 19, 1941; and in my copending application for patent, Serial Number 432,700, filed February 29, 1942, I disclose heat responsive means for controlling the operation of the exhaust turbo-supercharger forming part of the present blowing appliance for scavenging and supercharging air.

In carrying out my invention I combine with a loop scavenging type of internal combustion engine and its control means, an air blower or blowing appliance which includes a rotary engine-operated, positive displacement, air-compressor or pump for supplying both scavenging air and fuel air under pressure to a single air manifold communicating with the engine cylinders; and a supercharger operated by kinetic energy of exhaust gases from the cylinders to furnish compressed air directly into the positive displacement engine-operated air-compressor.

The blowing appliance is thus equipped with a single intake for air at atmospheric pressure, and the blower or blowing appliance is also equipped with a single compressed-air outlet capable of supplying to the air manifold and cylinders communicating therewith, at all times, a constant properly proportioned airflow, varying with the requirements of and conforming to changes in the controlled power and speed of the engine.

The rate of fuel-oil injection to the engine cylinders, is of course, increased and decreased, conforming with the changes in the charges of fuel-air to the cylinders; and a constant and uniform, but variable pressure of air is maintained in the air manifold for entry through the air ports to the multi-cylinders of the engine.

As is well known the blower or air blowing appliance is of essential importance for the most efficient operation of slow and medium speed engines of this type, and it will be apparent from the accompanying disclosures of my invention that the compact and integrated construction and arrangement of parts, within the maximum dimensions of the engine outline, save in weight of material and in space requirements, facilitate assemblies and installations, in maintenance, and also insures added efficiency from supercharging together with an increase in power by the use of kinetic energy from the exhaust gases.

By this novel combination and use with the engine of the blower or blowing appliance the air capacity of the engine is materially increased for supercharging, due to the use of available power inherent in the kinetic energy of the exhaust gas from the cylinders; and in addition, the higher air pressure developed and charged into the cylinders by the use of kinetic energy in the blower, enhances the brake mean effective pressure and the horsepower developed by the engine.

While I have illustrated and prefer to employ in the blower a double impeller Roots-type compresser adapted to operate from two to three times the engine speed, it will be understood that the use of other types of positive displacement compressors or pumps is contemplated for embodiment in the blower or blowing appliance.

I also utilize a spring gear on the engine shaft for a driving connection in a yieldable train of operating gears for the high speed air compressor, to reduce torsional vibrations and strains which might be injurious to the operation of the high speed positive displacement compressor.

The invention also includes in the loop scavenging system of the engine the use of exhaust ports and opposed air ports under control of the reciprocating pistons of the engine; together with closely associated, mechanically operated, engine operated, or automatically operated fuel-valves and ports timed to open and close to insure adequate supercharging of compressed air to the cylinders from the manifold. These latter air-intake valves are coordinated with the piston controlled exhaust ports and their opposed air ports to prevent charges of fuel air from entering the cylinders prior to opening of the exhaust ports, and also to prevent any exhaust gas from entering the air-charging manifold especially prior to discharge of exhaust gas from the cylinder to the exhaust manifold.

In the accompanying drawings I have illustrated one complete example of the physical embodiment of my invention wherein the parts are combined and arranged in accord with one mode I have devised for the practical application of the principles of my invention, together with a modified arrangement of the air intake valve; it will, however, be understood that other changes and alterations may be made and are contemplated in the disclosure, without departing from the spirit of my invention.

Figure 1 is a rear end elevation of so much of an engine as is necessary to illustrate the construction and compact arrangement of the cooperating parts involved in the blower or blowing appliance, full line arrows indicating the air-flow through the supercharger and the mechanically operated compressor; dotted arrows indicating the exhaust-gas-flow; and legends also being employed to designate the engine control and other accessories.

Figure 2 is a vertical detail sectional view longitudinally of the rear end of the engine showing a positive displacement rotary air compressor and its yielding train of operating gears; in different planes, sections of the engine housing, air manifold, and cylinder; an engine-operated swinging gate valve controlling a fuel-air port, and an air scavenging port; together with full line arrows indicating the air-flow and dotted line arrows indicating the flow of exhaust gas.

Figure 3 is a conventionalized side elevation of an in-line multi-cylinder two cycle engine and combined blower, disclosing in dotted lines at the front end of the engine the operating gears between the engine shaft and cam shaft for controlling the supercharging valves of the several cylinders.

Figure 4 is a top plan view of the conventionalized engine of Figure 3 illustrating the relation of the loop scavenging system with its intake ports and exhaust ports on opposite sides of the engine cylinders, and involving the blower or blowing appliance, exhaust gas manifolds, and engine-operated cam shaft.

Figure 5 is a partial face view and partial sectional view of a spring-gear for the yieldable operating train of the positive displacement rotary compressor; and Figure 6 is a transverse sectional view as at line 6—6 of Figure 5.

Figure 7 is an enlarged detail fragmentary view transversely of the engine indicating by arrows a scavenging loop in the cylinder, and showing one of the engine-operated supercharging air valves and a closed air intake scavenging port, and also showing one of the exhaust ports.

Figure 8 is a fragmentary sectional detail view, somewhat similar to Figure 7, but illustrating the supercharging fuel-air port controlled by an automatically opened swinging gate-valve.

In the assembly views Figures 1 and 3, especially, the disclosure includes a unitary housing H and six in-line cylinders C with dotted oil injectors I in the cylinder heads C', and by means of legends in Figure 1 the relative arrangement of exhaust manifolds, air manifold, engine control, lubricating oil pump, injector pump, fuel, and lubricating oil lines are indicated.

The engine shaft or crank shaft S may be coupled to the driven portion of a power plant by suitable means, as for instance the attaching flange S' and bolts and nuts. In Figure 2 one connecting rod assembly, including the piston P, is indicated to illustrate the relation of parts and the close, compact association of the blower as a whole with adjoining parts of the engine. The blowing unit or blower is located preferably at the rear end of the engine as here exemplified, one portion of the blowing appliance being disposed diagonally of the engine axis and another portion disposed tranversely of the axis of the engine within the maximum width and height of the housing H.

A single compressed-air manifold 1, extends longitudinally of the engine at one side thereof to supply both scavenging air and fuel combustion air under pressure to the cylinders, and removable plates 2, mounted in proper positions on the housing H, afford ready access to the interior of the manifold. At the opposite side of the engine two sectional longitudinally extending exhaust manifold sections 3 and 4 receive the exhaust gases from the cylinder exhaust ports, the number of sections being determined by the number of cylinders of the engine, and in this instance each section serves a group of three cylinders.

In Figure 1 a single suitable air intake 6, open to the atmosphere, is provided for the first portion of the composite blower or blowing appliance, which intake is connected with a turbo-supercharger forming part of the composite blower, and the air flow in the several figures of the drawings is indicated by solid line arrows, while the exhaust gas flow is designated by dotted line arrows, for convenience of illustration.

The supercharger, including the turbine casing 7, to which the air intake 6, and also the exhaust sections 3 and 4 are separately connected, and the impeller casing 8 in which the supercharging impeller is enclosed as indicated by dotted lines in Fig. 4, is provided with an exhaust-gas or spent-gas outlet 9 from the casing 7. The impeller casing 8 is provided with a compressed air delivery nozzle 10 that is connected directly to the positive displacement air compressor on top of which the supercharger is directly mounted.

The turbo-supercharger is thus equipped to utilize the kinetic energy inherent in the exhaust gas currents flowing from the cylinders through the exhaust sections 3 and 4, the turbine casing 7, and the exhaust outlet 9. The operating fluid-pressure in the turbine casing, or motor portion of the supercharger, is of course separated from the air under atmospheric pressure entering through the air intake 6, and air under pressure passing through the delivery nozzle 10 of the impeller is free from contact with exhaust gas currents.

The positive displacement rotary air compressor forming part of the composite blower or blowing appliance is mounted on a portion of the housing H transversely of the longitudinal axis of the engine, and includes a housing 11 with front and back plates 12 and 13 respectively bolted thereto; and at the sides of the engine in Figure 1 an air intake duct or joint 14, and an air delivery duct or joint 15 are united with the respective sides of the compressor casing. The joint duct 14 receives aid through intake 6 and casing 16 when the turbo-supercharger is not operating, and air under heavier pressure is supplied through this joint-duct when the supercharger is functioning. In both instances air under pressure is delivered through joint-duct 15 to the air manifold to build up a uniform volume of compressed air in the air manifold 1 for both scavenging and fuel combustion purposes conforming to the speed of the engine or revolutions of the engine shaft S.

Within the housing 11 are fashioned two transversely extending concaves 16 and 17 for the double rotary impellers 18 and 19, and the respective shafts 20 and 21 of these impellers are arranged parallel with the shaft S and journaled in bearings in the housing plates 12 and 13. These cooperating impellers, requiring power in direct proportion to the speed of the engine and the pressure developed, are operated by a simple direct drive from the engine shaft S, which includes the pinions 22 and 23 of the double impellors, intermediate gear 24, and a spring-gear mounted on the shaft S to insure a yieldable operating train of gears.

The spring-gear, as best seen in Figures 5 and 6, performs the functions of a cushion to absorb torsional strains and vibrations, and it includes a hub section 25, keyed on the shaft S to revolve therewith, having a circumferential series of radially spaced, exterior sockets 26 flaring outwardly with rounded ends 27. A gear-ring 28 is mounted on the hub section and provided with a complementary, interior, annular series of sockets 29 also fashioned with flared ends 30. These two series of sockets register to receive a series of steel springs 31 each fashioned as a set of laminated resilient plates, so that the springs may be flexed in contact with the flared or rounded ends of the opposed pairs of pockets or sockets as power is transmitted between the two sections of the gear wheel.

To retain the gear-sections and the springs against displacement or dislodgement, I utilize two side plates 32, 33, and bolts 34, which are passed through holes in the plates and gear-ring, are fastened by nuts 35 for clamping the parts together.

As best seen in Figures 7 and 8, the exhaust outlet ports 5 of the loop scavenging system extend along one side of the in-line engine cylinders C and communicate with the exhaust manifold sections 3 and 4, and these ports are controlled by the reciprocating pistons P.

At the opposite sides of the cylinders are arranged a series of scavenging ports 36 extending longitudinally of the engine and the air manifold 1, which air inlet ports are also controlled by the reciprocating pistons.

As shown in Figure 7 the descending piston P is opening the exhaust port 5 and about to open the air scavenging port 36 as the piston moves down and passes these ports on its working stroke; or just after the exhaust port and the scavenging port have been closed by the ascending piston on the corresponding compression stroke or up-stroke of the piston. As the piston P reaches a point near its lowest position on the working stroke the cam 46 through its linkage will open the valve 38 to admit a charge of compressed air.

Adjoining the series of scavenging ports between the cylinders and the air manifold are arranged another series of air ports 37 communicating with the cylinders and air manifold, and these ports are located between the scavenging ports 36 and the engine head C' or the combustion chambers of the cylinders.

The single port 37 here illustrated, is opened and closed by valve 38, preferably of the depending swinging gate type that is pivotally mounted at 39 in a suitable frame 40 exterior of the cylinder, and an open frame plate 41 is associated with the valve to limit its outward swing. In Figure 7 this gate valve 38 is mechanically opened, swinging inwardly toward the cylinder as indicated by the arrow, and the opening swing of the valve is timed or coordinated with the movement of the cam shaft 42, which shaft as usual is timed to turn with the crank shaft S and is arranged in proper position and journaled longitudinally of the engine for operating the respective oil injectors I of the engine. Inasmuch as the pressure of the charging air and the pressure of the scavenging air in the manifold 1 is less than the pressure of the exhaust gas, the valve 38 and the piston P close the ports 36 and 37 to prevent flow of exhaust gas through these ports to the manifold 1.

A suitable drive for the cam shaft 42 is indicated at the front end of the engine by the train of operating gears dotted in Figure 3, which includes a drive gear 43 on the shaft S and the driven gear 44 on the cam shaft 42, together with intermediate gears 45 enclosed within the gear casing 45'. For convenience of illustration the conventional gear train is indicated by dotted lines in Figure 3 within the casing 45'.

As best seen in Figure 7 the valve operating means includes a suitable cam 46 rigid with the cam shaft 42, which cam frictionally engages a cam roller 47 journaled at the upper end of a vertically reciprocating plunger rod 48 mounted to slide in bearings as 49 of the bracket 50, and passing downwardly through the top wall of the air manifold 1.

The lower end of the rod is pivotally connected at 51 with the free end of a lever arm 52 rigid with the pivot 39 of the valve 38, and it will be apparent that the depending gate valve is swung inwardly and upwardly to open position by depression of the plunger rod against tension of spring 53. Spring 53 is coiled about the rod 48 and enclosed within the rigidly supported spring housing 54 and it is compressed upon the opening movement of the valve under positive action of the cam, but expands when the roller 47 is free of the cam, to lift the rod and close the valve.

In Figure 8 in lieu of the mechanically operated swinging gate valve 38, a swinging gate valve 55 is opened and closed by fluid pressure imposed at its opposite sides, the opening movement being accomplished by compressed air in the air manifold as shown by the arrow, and the closing movement of the valve being accomplished on the compression stroke of the piston P.

The supercharging valves 38, 55, are timed to close to prevent exhaust gas from passing through ports 37 into the air manifold, and these valves are opened after the exhaust port is closed by the piston P, so that a charge of fuel air may flow from the air manifold into the cylinder.

Other modes of arranging the scavenging loop indicated in Figure 7 are also contemplated in the physical embodiment of my invention, as for instance, both the air supply port and the exhaust port may be arranged at the same side of a cylinder.

When the engine is started the double-impeller positive-displacement air compressor is operated to induce flow of air currents from the atmosphere through the intake, the impeller-casing, and the nozzle of the supercharger, to the compressor housing 11 where the interengaging double-impellers force the air through the delivery joint-duct 15 into the air manifold 1 as indicated by the arrows in Figure 1 building up the desired volume of compressed air for scavenging and supercharging purposes. As the speed of the reciprocating pistons eccelerates thereby creating a sufficient power, or kinetic energy in the exhaust gas currents passing from the exhaust ports through the exhaust sections and the turbo-motor portion of the supercharger, this kinetic energy in the supercharger is utilized to supply compressed air from the supercharger to and through the positive displacement compressor of the blower or blowing appliance.

By utilizing the positive displacement compressor for furnishing air under pressure for both fuel-combustion and scavenging purposes, and by supplementing this pressure with the superimposed pressure of the supercharger, the pressure and volume of air in the air manifold 1 is substantially increased in an economical and efficient manner; and in addition to increasing the horsepower of the engine I accomplish a saving in engine power ordinarily required to operate the positive displacement compressor, and also economize in the use of fuel required per horsepower developed by the engine.

By embodying the supercharger in the blowing appliance and utilizing the kinetic energy therein with the engine-operated positive displacement air compressor, when the kinetic energy of the exhaust gas develops sufficient volume and power in the tubo-supercharger to provide fluid pressure on the double impellers of the positive displacement air compressor, the latter is directly driven by such fluid pressure so that the positive displacement compressor through its interengaging impellers now performs the functions of a motor, transmitting power through the train of operating gears back to the engine shaft S.

Thus, with the supercharger, under kinetic energy operating at full capacity and efficiency, compressed air is supplied to the positive displacement compressor in intensity and volume to operate the compressor as a motor, the pressure of air built up in the air manifold and charged to the cylinders is automatically increased, and with complementary increase in oil supplied to the mixture, the horsepower of the engine is enhanced and with a corresponding decrease in the consumption of fuel oil per horsepower of the engine.

A reciprocating or other type of positive displacement pump or compressor may be employed as optional equipment, in lieu of the rotary Roots type air compressor, and similar desirable results will accrue in furnishing compressed air to the air manifold and cylinders of the engine. With such type of positive displacement air compressor the supercharger may also be embodied in the blowing appliance with resulting supercharging of the cylinders with increased power and economy in two cycle loop scavenging engines.

Having thus fully described my invention, what I claim as new and desire to secure by Letters Patent is:

1. The combination with a two-cycle internal combustion engine of the loop scavenging type having an air manifold and exhaust manifold, of a unitary air-blowing appliance including an engine operated positive displacement compressor having an intake, and constantly supplying scavenging air and fuel combustion air under pressure to the air manifold, and a supercharger activated by kinetic energy from the exhaust manifold to furnish compressed air directly into the intake of the compressor.

2. The combination with a two cycle internal combustion engine having an air manifold and exhaust manifold, of a rotary supercharger having an air intake and activated by kinetic energy from the exhaust manifold, a constantly engine-operated positive displacement compressor, an air intake joint duct uniting the intake of the compressor and the supercharger, and a compressed air duct joint uniting the air manifold with the compressor.

3. The combination with a two cycle internal combustion engine of the loop scavenging type having an air manifold and exhaust manifold, of a rotary supercharger having an air intake and exhaust outlet and activated by kinetic energy from the exhaust manifold, a rotary positive displacement air compressor, a yieldable train of operating gears between the engine shaft and the air compressor, an air intake joint duct uniting the supercharger and the compressor, and a compressed air joint duct uniting the air compressor and the air manifold.

4. The combination with a two-cycle internal combustion engine of the loop scavenging type having an air manifold and exhaust manifold at opposite sides thereof, of a unitary blowing appliance including a rotary supercharger having an air intake and exhaust outlet and activated by kinetic energy from the exhaust manifold, a constantly rotatable positive displacement engine operated air compressor having a single intake receiving air directly from said supercharger at one side of the air compressor, and a direct joint-duct uniting the other side of the compressor to said air manifold.

5. The combination with a two cycle internal combustion engine of the loop scavenging type having an air manifold and exhaust manifold at opposite sides thereof, of a unitary blowing appliance mounted at one end and forming a part of the engine within the maximum dimensions thereof, said appliance including a rotary supercharger having a single air intake and an exhaust outlet and activated by kinetic energy from the exhaust manifold, a rotary positive displacement air compressor constantly receiving air directly from the supercharger, a yieldable train of operating gears arranged transversely of the engine between the engine shaft and said compressor, and a joint-duct directly uniting said compressor and the air manifold.

6. The combination in a two cycle internal combustion engine having an air manifold, piston-controlled air inlet ports and valved supercharging ports; and an exhaust manifold with exhaust ports controlled by the piston; of a unitary blowing appliance including supercharger activated by exhaust gas from the exhaust manifold, a constantly driveable engine operated positive complacement air compressor supplying air under pressure to the air manifold, and an air-joint duct uniting the supercharger and the compressor.

7. The combination in a two cycle internal combustion engine, its crank shaft and cam shaft operated thereby, an air manifold, an exhaust gas manifold having piston-controlled ports, said air manifold having piston-controlled ports and valves for controlling adjoining supercharging ports, and means actuated by the cam shaft for operating said valves, of a supercharger activated by kinetic energy from the exhaust manifold, an engine operated positive displacement air compressor constantly supplying air under pressure to the air manifold, and an air joint duct directly uniting the air outlet of the supercharger and the intake of the air compressor.

8. The combination in a two cycle internal combustion engine, its crank shaft and cam shaft operated thereby, an air manifold, an exhaust gas manifold having piston controlled ports, said air manifold having piston-controlled scavenging ports and valves for controlling adjoining supercharging ports, and operating means for the valves controlled by said cam shaft, of a supercharger activated by kinetic energy from the exhaust manifold, a rotary positive displacement compressor constantly supplying air under pressure to the air manifold, a train of yieldable operating gears between the crank shaft and said compressor, and an air-joint duct directly uniting the air outlet of the supercharger and the air intake of the compressor.

9. The combination with a two cycle internal combustion engine having an air manifold and exhaust manifold, of a unitary blower including a housing, a pair of constantly driveable interengaging rotary impellers within the casing forming a positive displacement compressor for supplying air under pressure directly to the air manifold, a train of operating gears between the engine and said impellers, and a rotary supercharger having an air outlet and activated by kinetic energy from the exhaust manifold directly united with a single intake of the positive displacement compressor.

10. The combination with a twocycle internal combustion engine having an air manifold and exhaust manifold, of a positive displacement blower having a single air intake, and a single compressed air outlet to the air manifold, said blower including a pair of interengaging rotary impellers supplying air under pressure to said outlet, constantly driveable engine-operated means for activating said impellers, and a rotary supercharger activated by kinetic energy from the exhaust manifold having an air outlet directly united with the single intake of the blower.

11. The combination with a two cycle internal combustion engine having an air manifold and exhaust manifold, of a constantly driveable positive displacement air compressor having a single intake and directly united with the air manifold, and operating means for said compressor, a supercharger open to the atmosphere and having a compressed air outlet directly united with the single intake of the compressor, and said supercharger having operating means open to the exhaust manifold and activated by kinetic energy of exhaust gas.

12. The combination with a two cycle internal combustion engine having an air manifold and exhaust manifold, of a rotary positive displacement constantly driveable engine operated air compressor united with the air manifold and having an air intake, a rotary supercharger open to the atmosphere and having its compressed-air outlet united directly with the intake of the compressor, and said supercharger having rotary operating means open to the exhaust manifold and activated by kinetic energy of exhaust gas.

FRANK B. YINGLING.